(12) United States Patent
Chen et al.

(10) Patent No.: US 12,210,714 B2
(45) Date of Patent: Jan. 28, 2025

(54) TOUCH MODULE AND METHOD OF MANUFACTURING THE SAME

(71) Applicant: TPK Advanced Solutions Inc., Fujian (CN)

(72) Inventors: Xiang Mei Chen, Xiamen (CN);
Tai-Shih Cheng, Taipei (TW);
Lien-Hsin Lee, Taipei (TW); Liang Liu, Yong'an (CN)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 18/086,728

(22) Filed: Dec. 22, 2022

(65) Prior Publication Data

US 2024/0211086 A1 Jun. 27, 2024

(51) Int. Cl.
*G06F 3/044* (2006.01)

(52) U.S. Cl.
CPC .......... *G06F 3/0448* (2019.05); *G06F 3/0445* (2019.05); *G06F 3/0446* (2019.05); *G06F 2203/04103* (2013.01); *G06F 2203/04112* (2013.01)

(58) Field of Classification Search
CPC ........ G06F 3/044; G06F 3/041; G06F 3/0448; G06F 3/0445; G06F 3/0446; G06F 2203/04103; G06F 2203/04112
See application file for complete search history.

(56) References Cited

U.S. PATENT DOCUMENTS

| | | | |
|---|---|---|---|
| 2015/0108085 A1* | 4/2015 | Hwang | G06F 3/0445 216/13 |
| 2016/0011700 A1* | 1/2016 | Hasegawa | G06F 3/0446 345/174 |
| 2016/0149572 A1* | 5/2016 | Chen | G06F 3/047 345/173 |
| 2016/0209967 A1* | 7/2016 | Ku | G06F 3/0446 |
| 2017/0228090 A1* | 8/2017 | Nakamura | G06F 3/0445 |
| 2018/0232080 A1* | 8/2018 | Iwami | H05K 9/0096 |
| 2018/0307350 A1* | 10/2018 | Nukui | G06F 3/044 |
| 2022/0308702 A1 | 9/2022 | Wang et al. | |

(Continued)

FOREIGN PATENT DOCUMENTS

| | | |
|---|---|---|
| CN | 107710122 A | 2/2018 |
| CN | 115220605 A | 10/2022 |

(Continued)

*Primary Examiner* — Md Saiful A Siddiqui
(74) *Attorney, Agent, or Firm* — Cooper Legal Group, LLC

(57) ABSTRACT

A touch module includes first and second mesh electrode layers respectively with first and second irregular mesh patterns. Line segments of the first irregular mesh pattern are configured to form a first radial pattern having a first intersection point by translation. A top X % fan-blade shape area of line segment density in the first radial pattern is defined as a first dense area, in which X is at least 10. Line segments of the second irregular mesh pattern are configured to form a second radial pattern having a second intersection point by translation. A top X % fan-blade shape area of line segment density in the second radial pattern is defined as a second dense area. When the first radial pattern and the second radial pattern are translated so that the first and second intersection points coincide, the first dense area and the second dense area do not overlap.

12 Claims, 12 Drawing Sheets

(56) References Cited

U.S. PATENT DOCUMENTS

2023/0038087 A1* 2/2023 Lee ................... G06F 3/0446
2023/0205378 A1* 6/2023 Fukuda ............... G06F 3/0446
                                                    345/174

FOREIGN PATENT DOCUMENTS

| TW | 201923531 A | 6/2019 |
| TW | 202036246 A | 10/2020 |

* cited by examiner

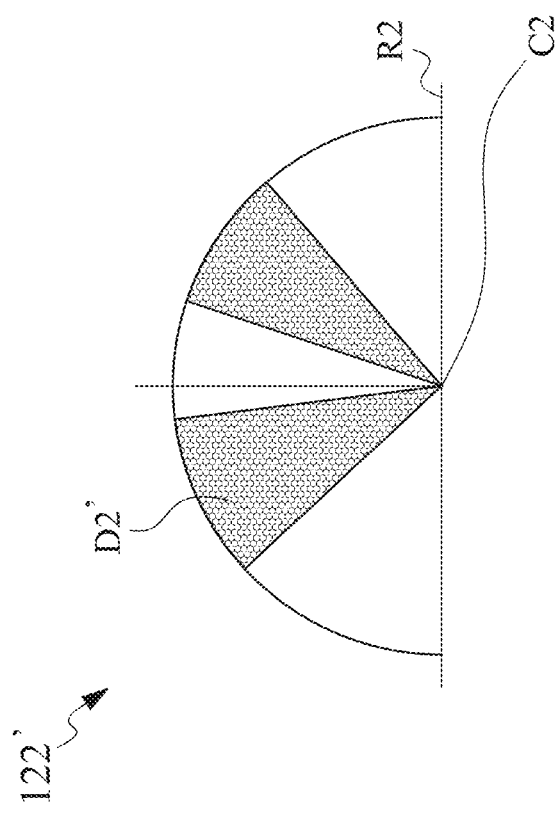

TOUCH MODULE AND METHOD OF MANUFACTURING THE SAME

BACKGROUND

Technical Field

The present disclosure relates to a touch module and a method of manufacturing the same.

Description of Related Art

In order to reduce the Moiré pattern effect of a touch module using metal meshes as electrode layers, a random metal mesh design is generally used to superimpose the two electrode layers. However, in the existing design, the mesh lines of the two metal meshes often have a large number of overlaps. This phenomenon will greatly increase the parasitic capacitance (Cm) of the two metal meshes when forming a double-layer touch panel. That is to say, a parasitic capacitance will be formed in the overlapping area between the metal layers. The larger the overlapping area, the larger the parasitic capacitance, which increases the resistance-capacitance (RC) load and reduces the refresh rate. As the response speed and refresh rate of touch display devices are increasingly required, if the parasitic capacitance between the two electrode layers of the touch module cannot be effectively reduced, the parasitic capacitance will interfere with touch sensing. For example, China Patent Application Publication No. 107710122A discloses a mesh pattern design method for a conductive film used in a touch panel. Although the proposed technical solution can reduce parasitic capacitance, the proposed technical solution does not solve the Moiré problem.

Accordingly, how to provide a touch module and a method of manufacturing the same to solve the aforementioned problems becomes an important issue to be solved by those in the industry.

SUMMARY

An aspect of the disclosure is to provide a touch module and method of manufacturing the same that can efficiently solve the aforementioned problems.

According to an embodiment of the disclosure, a touch module includes a first mesh electrode layer and a second mesh electrode layer. The first mesh electrode layer has a first irregular mesh pattern. The first irregular mesh pattern includes a plurality of line segments configured to form a first radial pattern having a first intersection point by translation. A top X % fan-blade shape area of line segment density in the first radial pattern is defined as a first dense area, in which X is at least 10. The second mesh electrode layer has a second irregular mesh pattern. The second irregular mesh pattern includes a plurality of line segments configured to form a second radial pattern having a second intersection point by translation. A top X % fan-blade shape area of line segment density in the second radial pattern is defined as a second dense area. When the first radial pattern and the second radial pattern are translated so that the first intersection point and the second intersection point coincide, the first dense area and the second dense area do not overlap in a projection direction.

In an embodiment of the disclosure, X is 15, 20, or 30.

In an embodiment of the disclosure, the line segments of the first radial pattern and the line segments of the second radial pattern are 360-degree radiating relative to the first intersection point and the second intersection point, respectively.

In an embodiment of the disclosure, the line segments of the first radial pattern and the line segments of the second radial pattern are 180-degree radiating relative to the first intersection point and the second intersection point, respectively.

In an embodiment of the disclosure, a number of the line segments of the first radial pattern and a number of the line segments of the second radial pattern are equal to or greater than 300.

In an embodiment of the disclosure, the line segments of the first radial pattern are obtained from a plurality of grids of the first irregular mesh pattern. The line segments of the second radial pattern are obtained from a plurality of grids of the second irregular mesh pattern.

In an embodiment of the disclosure, the grids of the first irregular mesh pattern are located in separate regions of the first irregular mesh pattern. The grids of the second irregular mesh pattern are located in separate regions of the second irregular mesh pattern.

In an embodiment of the disclosure, a number of the separate regions of the first irregular mesh pattern and a number of the separate regions of the second irregular mesh pattern are equal to or greater than 5.

According to an embodiment of the disclosure, a method of manufacturing a touch module includes: generating a first irregular mesh pattern and a second irregular mesh pattern; translating a plurality of line segments of the first irregular mesh pattern to form a first radial pattern with a first intersection point, in which a top X % fan-blade shape area of line segment density in the first radial pattern is defined as a first dense area, and X is at least 10; translating a plurality of line segments of the second irregular mesh pattern to form a second radial pattern with a second intersection point, in which a top X % fan-blade shape area of line segment density in the second radial pattern is defined as a second dense area; translating the first radial pattern and the second radial pattern so that the first intersection point and the second intersection point coincide; rotating the second radial pattern by an angle along a rotation direction with the second intersection point as a center, so that the first dense area and the second dense area do not overlap; and forming a first mesh electrode layer and a second mesh electrode layer respectively according to a superposition design of the first irregular mesh pattern and the second irregular mesh pattern rotated by the angle along the rotation direction.

In an embodiment of the disclosure, X is 15, 20, or 30.

In an embodiment of the disclosure, the line segments of the first radial pattern are obtained from a plurality of grids of the first irregular mesh pattern. The line segments of the second radial pattern are obtained from a plurality of grids of the second irregular mesh pattern.

In an embodiment of the disclosure, each of the line segments of each of the grids has a starting point and an end point along an arrangement direction. The translating the line segments of the first irregular mesh pattern makes the starting points of the line segments of the first irregular mesh pattern coincide with the first intersection point. The translating the line segments of the second irregular mesh pattern makes the starting points of the line segments of the second irregular mesh pattern coincide with the second intersection point.

In an embodiment of the disclosure, the translating the line segments of the first irregular mesh pattern makes the line segments of the first radial pattern be 360-degree radiating relative to the first intersection point. The translating the line segments of the second irregular mesh pattern makes the line segments of the second radial pattern be 360-degree radiating relative to the second intersection point.

In an embodiment of the disclosure, each of the line segments of each of the grids has a starting point and an end point along an arrangement direction. The translating the line segments of the first irregular mesh pattern includes: making the starting points of the line segments of the first irregular mesh pattern coincide with the first intersection point; dividing the line segments of the first irregular mesh pattern into a first group and a second group based on a first reference line passing through the first intersection point; and rotating the second group of the first irregular mesh pattern by 180 degrees along the rotation direction with the first intersection point as a center, so that the first group and the rotated second group of the first irregular mesh pattern form the first radial pattern. The translating the line segments of the second irregular mesh pattern includes: making the starting points of the line segments of the second irregular mesh pattern coincide with the second intersection point; dividing the line segments of the second irregular mesh pattern into a first group and a second group based on a second reference line passing through the second intersection point; and rotating the second group of the second irregular mesh pattern by 180 degrees along the rotation direction with the second intersection point as a center, so that the first group and the rotated second group of the second irregular mesh pattern form the second radial pattern.

In an embodiment of the disclosure, the translating the line segments of the first irregular mesh pattern makes the line segments of the first radial pattern be 180-degree radiating relative to the first intersection point. The translating the line segments of the second irregular mesh pattern makes the line segments of the second radial pattern be 180-degree radiating relative to the second intersection point.

In an embodiment of the disclosure, the grids of the first irregular mesh pattern are located in separate regions of the first irregular mesh pattern. The grids of the second irregular mesh pattern are located in separate regions of the second irregular mesh pattern.

In an embodiment of the disclosure, a number of the separate regions of the first irregular mesh pattern and a number of the separate regions of the second irregular mesh pattern are equal to or greater than 5.

In an embodiment of the disclosure, a number of the line segments of the first radial pattern and a number of the line segments of the second radial pattern are equal to or greater than 300.

Accordingly, in the touch module and the method of manufacturing the same of the present disclosure, when the first radial pattern obtained from the first mesh electrode layer and the second radial pattern obtained from the second mesh electrode layer are translated so that the first intersection point of the first radial pattern coincides with the second intersection point of the second radial pattern, the first dense area of the first radial pattern does not overlap with the second dense area of the second radial pattern in the projection direction. In this way, the Moiré effect of the touch module can be effectively solved and the parasitic capacitance can be reduced.

It is to be understood that both the foregoing general description and the following detailed description are by examples and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 5b is a normalized circle schematic diagram simulated by statistical software for normalizing the line segments of the grid shown in FIG. 5a;

FIG. 11 is a schematic diagram of a second radial pattern according to another embodiment of the present disclosure.

DETAILED DESCRIPTION

Figure 1:
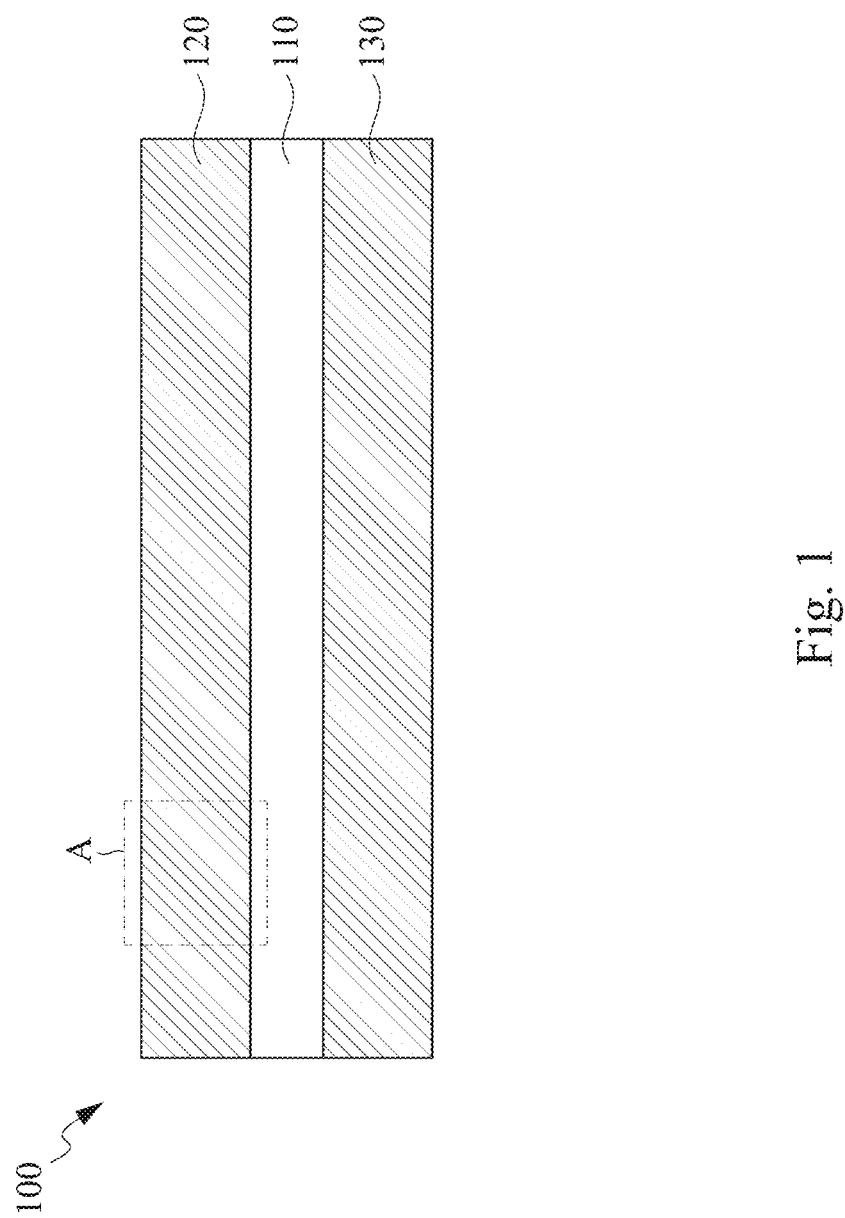
FIG. 1 is a perspective view of a touch module according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a perspective view of a touch module 100 according to an embodiment of the present disclosure. As shown in FIG. 1, in the present embodiment, the touch module 100 includes a first mesh electrode layer 120, a second mesh electrode layer 130, and an insulating layer 110. The insulating layer 110 is disposed between the first mesh electrode layer 120 and the second mesh electrode layer 130 to insulate the first mesh electrode layer 120 from the second mesh electrode layer 130. The first mesh electrode layer 120 is cut to include a plurality of first-axis electrodes (not shown) separated from each other. The second mesh electrode layer 130 is cut to include a plurality of second-axis electrodes (not shown) separated from each other. The aforementioned "first-axis" and "second-axis" refer to extending along the X direction and the Y direction, respectively, for example. In other words, the first-axis electrodes are conductive lines extending along the X direction and arranged at intervals. The second-axis electrodes are conductive lines extending along the Y direction and arranged at intervals.

Figure 2:
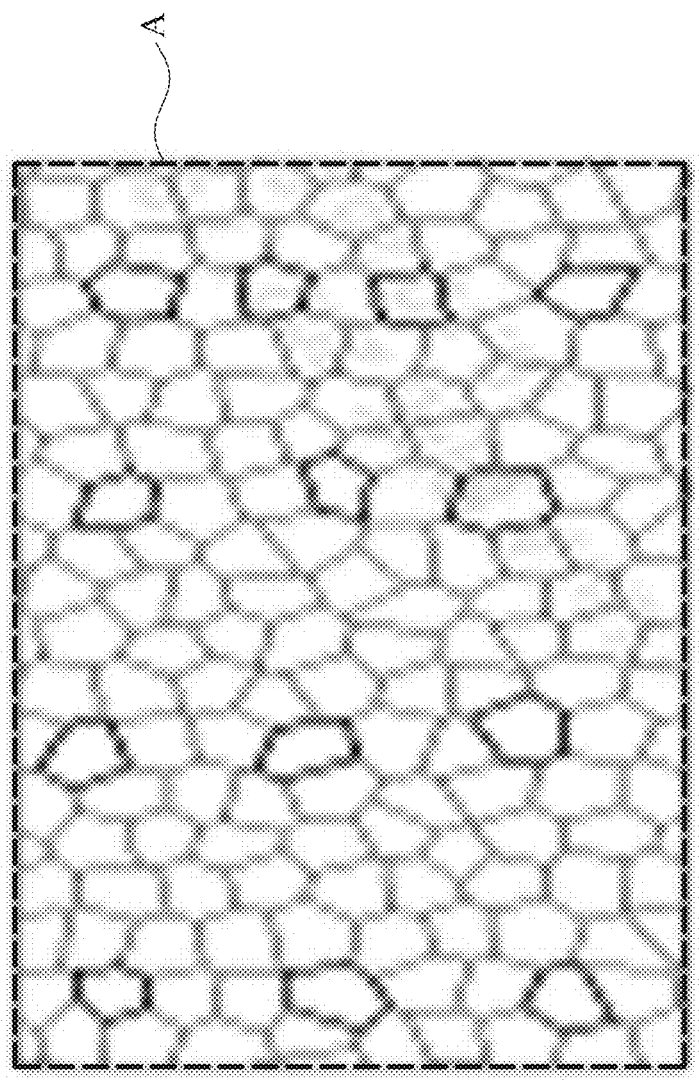
FIG. 2 is a top view of a region of a first irregular mesh pattern of a first mesh electrode layer in FIG. 1.
Figure 3:
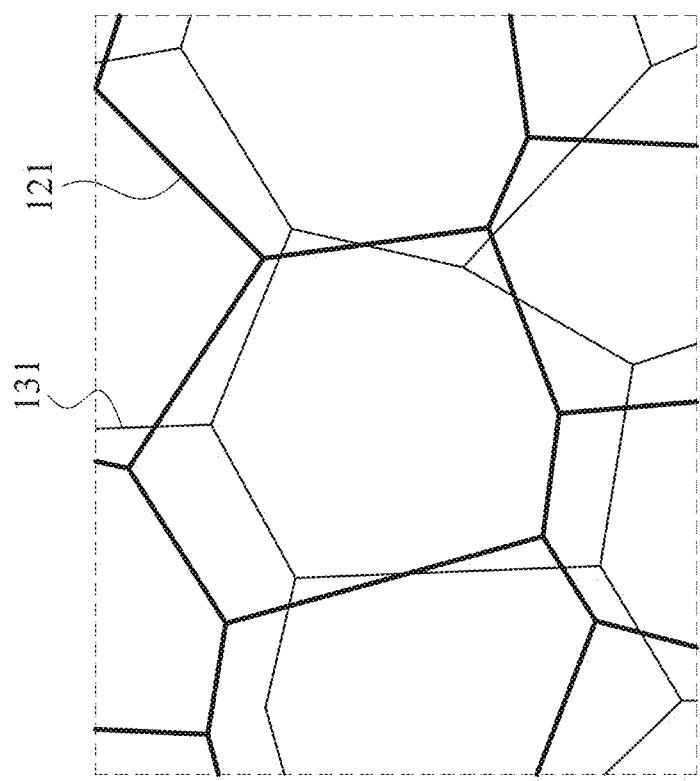
FIG. 3 is a partial schematic diagram showing the overlapping of the first irregular mesh pattern and a second irregular mesh pattern according to an embodiment of the present disclosure.

Reference is made to FIG. 2. FIG. 2 is a top view of a region A of a first irregular mesh pattern 121 of the first mesh electrode layer 120 in FIG. 1. As shown in FIGS. 2 and 3, in the present embodiment, the first mesh electrode layer 120 has a first irregular mesh pattern 121. The first irregular mesh pattern 121 includes a plurality of grids. Each of the grids consists of a plurality of line segments.

In some embodiments, each of the grids consists of six line segments, but the disclosure is not limited in this regard.

Reference is made to FIG. 3. FIG. 3 is a partial schematic diagram showing the overlapping of the first irregular mesh pattern 121 and a second irregular mesh pattern 131 according to an embodiment of the present disclosure. As shown in FIG. 3, in the present embodiment, the line segments of the first irregular mesh pattern 121 do not overlap significantly with the line segments of the second irregular mesh pattern 131, so the parasitic capacitance can be effectively reduced. Moreover, since the line segments of the first irregular mesh pattern 121 and the line segments of the second irregular mesh pattern 131 do not have obvious and regular parallel phenomena, the Moiré effect can be effectively reduced.

Figure 4:
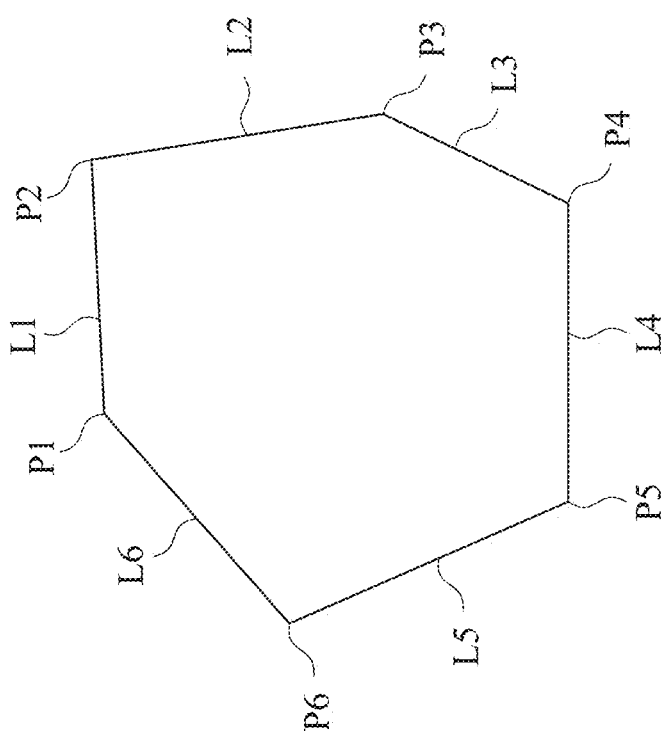
FIG. 4 is a schematic diagram of one of grids of the first irregular mesh pattern according to an embodiment of the present disclosure.
Figure 5A:
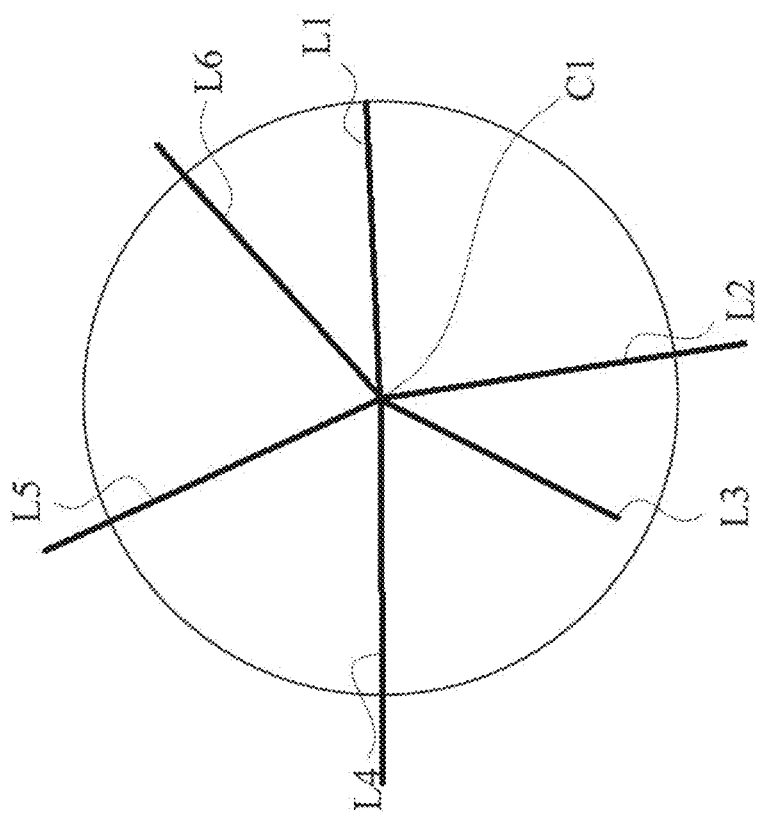
FIG. 5a is a schematic diagram showing the translation of line segments of the grid in FIG. 4.
Figure 5B:
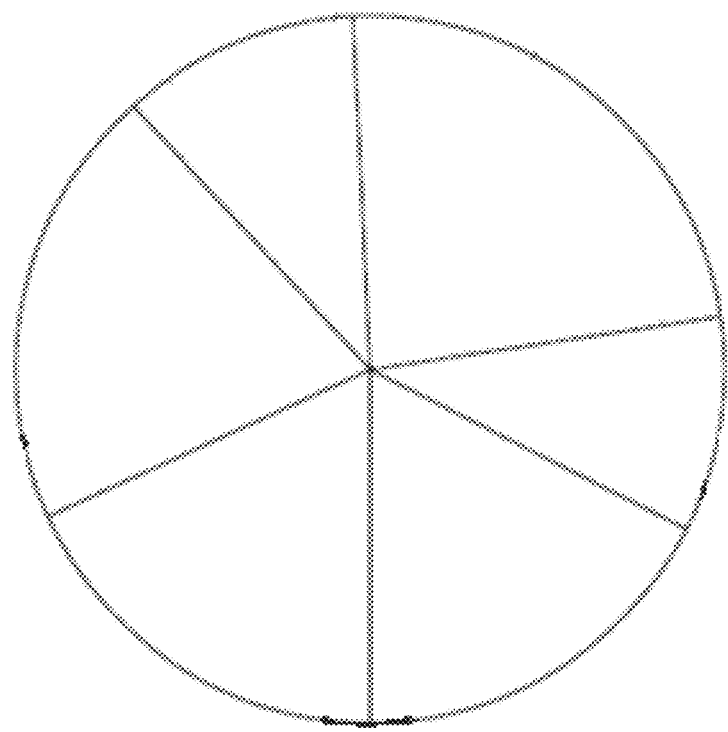

Reference is made to FIG. 4 and FIGS. 5a and 5b. FIG. 4 is a schematic diagram of one of the grids of the first irregular mesh pattern 121 according to an embodiment of the present disclosure. FIG. 5a is a schematic diagram showing the translation of line segments of the grid in FIG. 4. FIG. 5b is a normalized circle schematic diagram simulated by statistical software for normalizing the line segments of the grid shown in FIG. 5a.

Figure 6:
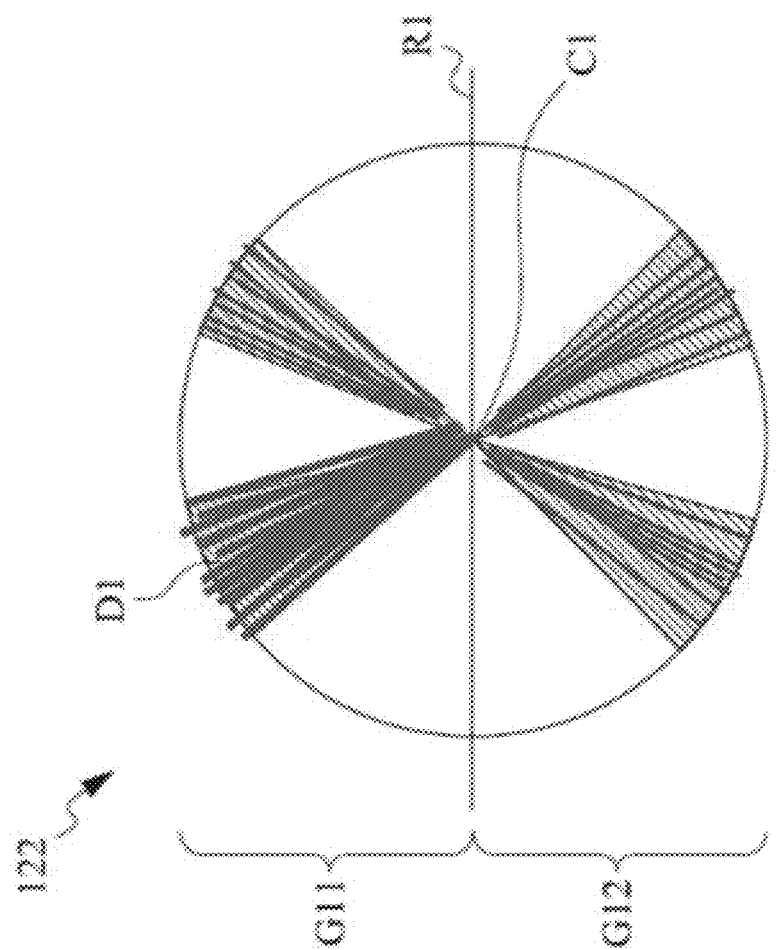
FIG. 6 is a schematic diagram of a first radial pattern according to an embodiment of the present disclosure.

In the present embodiment, as shown in FIG. 4, a single grid it is may be deconstructed and have line segments L1, L2, L3, L4, L5, and L6 sequentially connected to endpoints P1, P2, P3, P4, P5, and P6. Also, it is noted FIG. 4 shows line segments may be different lengths (such as L1, L2, L3, L4, L5, L6) in one random mesh. In order to further figure out the directional distribution of line segment density shown in FIG. 5a, line segments with different lengths (such as L1, L2, L3, L4, L5, L6) in one random mesh should be normalized so as to form a statistical standard circle schematic diagram (i.e., FIG. 5b) simulated by statistical software for use in establishing a schematic diagram of the first radial pattern shown in FIG. 6. The line segments L1, L2, L3, L4, L5, and L6 each have a starting point and an end point along an arrangement direction. For example, if the starting points and end points of the line segments L1, L2, L3, L4, L5, and L6 are connected alternately in a clockwise direction, then the starting point and end point of the line segment L1 are point P1 and P2 respectively. Similarly, the starting point and the end point of the line segment L2 are points P2 and P3 respectively. The starting point and the end point of the line segment L3 are points P3 and P4 respectively. The starting point and the end point of the line segment L4 are points P4 and P5 respectively. The starting point and the end point of the line segment L5 are points P5 and P6 respectively. The starting point and the end point of the line segment L6 are points P6 and P1 respectively. If the arrangement direction is the clockwise direction, when the line segments L1, L2, L3, L4, L5, and L6 in FIG. 4 are translated so that the starting points coincide with the first intersection point C1, the pattern shown in FIG. 5a can be obtained. FIG. 5a shows that the starting point P1 of L1, the starting point P2 of L2, the starting point P3 of L3, the starting point P4 of L4, the starting point P5 of L5 and the starting point P6 of L6 are gathered at the first intersection point C1. FIG. 5b is a normalized circle schematic diagram simulated by statistical software for normalizing the line segments of the grid shown in FIG. 5a. Afterwards, by virtue of normalizing the pattern shown in FIG. 5a, C1 become the center of the circle of FIG. 5b. The line segments of the first irregular mesh pattern 121 can be translated to form a first radial pattern 122 with a first intersection point C1 (at least 300 line segments to be statistically significant), as shown in FIG. 6. In detail, the first radial pattern 122 may be composed of the line segments of the grids located in a plurality of separate regions of the first irregular mesh pattern 121 (e.g., arbitrarily selecting the separate regions that are not connected in the region A) and stacked together. For example, a collection of five separate regions in the region A with at least 300 line segments can be statistically significant. In other words, the first radial pattern 122 is not formed by all the line segments of the first irregular mesh pattern 121. The aforementioned separate regions can be uniformly selected on the first irregular mesh pattern 121.

Figure 7:
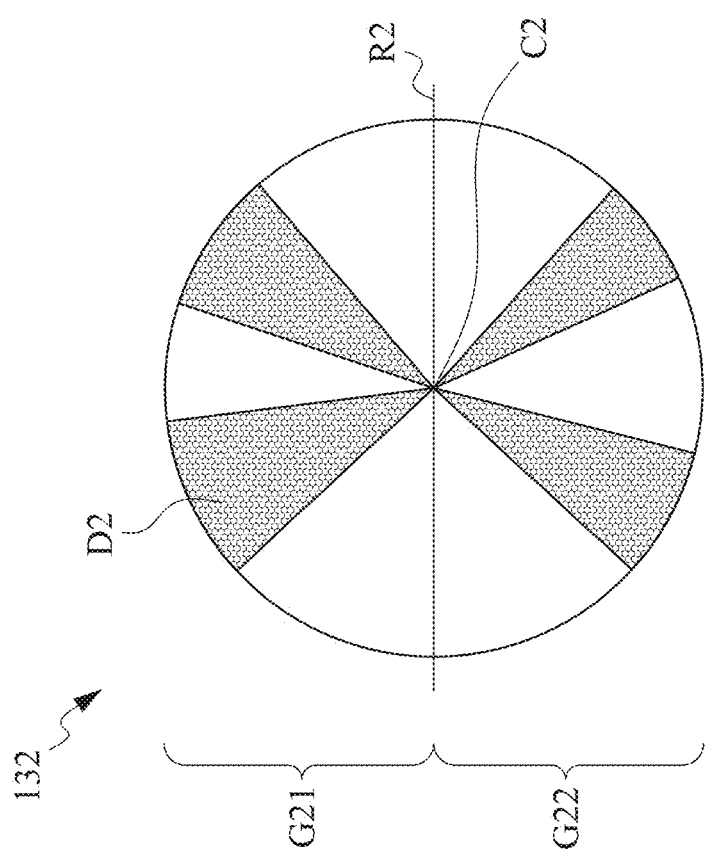
FIG. 7 is a schematic diagram of a second radial pattern according to an embodiment of the present disclosure.

Reference is made to FIGS. 6 and 7. FIG. 6 is a schematic diagram of the first radial pattern 122 according to an embodiment of the present disclosure. FIG. 7 is a schematic diagram of a second radial pattern 132 according to an embodiment of the present disclosure.

According to the translation method of the line segments of the grids corresponding to FIGS. 4 and 5, the first radial pattern 122 shown in FIG. 6 can be obtained after translating all the line segments of the grids in the plurality of separate regions of the first irregular mesh pattern 121. In addition, in some embodiments, the second radial pattern 132 shown in FIG. 7 can also be formed by the line segments of the second irregular mesh pattern 131 in the same manner as the first radial pattern 122 is formed (i.e., similar to the sequence of FIGS. 5a, 5b, 6).

In order to reduce the Moiré pattern effect generated between two mesh layers, since the first radial pattern 122 and the second radial pattern 132 respectively stand for the statistical line segment distribution of two mesh layers (each statistical line segment distribution of each mesh layer includes at least 300 lines from 5 selected areas form the mesh and show the density distribution), the 10-30% dense line directional distribution of the mesh layer should not overlap with the 10-30% dense line directional distribution of another mesh layer. As shown in FIGS. 6 and 7, in some embodiments, a top X % fan-blade shape area of line segment density in the first radial pattern 122 is defined as a first dense area D1, in which X is at least 10. A top X % fan-blade shape area of line segment density in the second radial pattern 132 is defined as a second dense area D2. Statistically, it is noted that FIG. 6 fully stands for the directional distribution of the whole mesh layer because there are more than 300 lines added up in FIG. 6. By virtue of statistical software analysis for the directional distribution of the whole mesh layer, if the top 10% fan-blade shape area of the whole circle area is selected as first dense area D1, the term "X" within the sentence "so-called top X % fan-blade shape area of line segment density in the first radial pattern 122" is defined as "10" (i.e., 10%=top 10% fan-blade shape dense area/whole area, X=10). Similarly, per statistical needs, if the top 20% area of the whole circle area is selected as first dense area D1, the term "X" is defined as "20". In preferred embodiment, at least 10% fan-blade shape area of line segment density in the first radial pattern 122 should not be overlapped by at least 10% fan-blade shape area of line segment density in the second radial pattern 132 so as to lower Moiré pattern effect.

By way of example, in ideal condition, if all selected line segments (e.g., if 300 lines from 5 selected areas forming the mesh recited in paragraph (0047)) are evenly disposed at different angles (e.g., given that a circle is 360°, if one unit is 5°, the total number of units is 72, where a first unit corresponds to 0-5° segment of the circle, a second unit corresponds to 5°-10° segment of the circle, a third unit corresponds to 10°-15° segment of the circle, etc.) in one mesh. The Moiré effect will be avoided when the first mesh electrode layer 120 (i.e., first touch electrode) is stacked on the second mesh electrode layer 130 (i.e., second touch electrode) to form a capacitive touch screen.

However, in reality, when the random mesh pattern is created, all selected line segments are not evenly disposed at different angles. For example, in the first radial pattern 122 of the first mesh electrode layer 120, if the total number of units is 72 and X=10, the selected top 10% area corresponds to at least 7.2 units. The number of line segments in every 5° segment is counted and statistically quantified, and the 7 most dense units (i.e., units having the highest number of line segments contained therein) might be segments representing 5°-10°, 30°-35°, 70°-75°, 125°-130°, 150°-155°, 260°-265°, and 310°-315° of the circle.

Similarly, in the second radial pattern 132 of the second mesh electrode layer 130, if the total number of units is 72 and X=10, the number of line segments in every 5° segment is counted and statistically quantified, and the 7 most dense units (i.e., units having the highest number of line segments contained therein) might be segments representing 20°-25°, 40°-45°, 75°-80°, 140°-145°, 160°-165°, 270°-275°, and 330°-335° of the circle.

Thereafter, the first radial pattern 122 and the second radial pattern 132 are overlapped in an X-Y coordinate system and checked to see whether the 7 most dense units of the first radial pattern 122 overlap with 7 most dense units of the second radial pattern 132. If the 7 most dense units of the first radial pattern 122 overlap with the 7 most dense units of the second radial pattern 132, the second radial pattern 132 is rotated by 0 relative to the first radial pattern 122 with reference to X-Y coordinate system to make the 7 most dense units of the first radial pattern 122 not overlap with the 7 most dense units of the second radial pattern 132. In such a way, the spatial relation condition of the two meshes is optimized and fixed, and the touch screen design will avoid Moiré effect.

Of course, if the 7 most dense units of the first radial pattern 122 do not overlap with the 7 most dense units of the second radial pattern 132, there is no need to perform the rotation procedure.

In some embodiments, per statistical needs, X is selected as 15, 20, or 30 (preferably, no more than 30%) so as to effectively lower Moiré pattern effect, but the disclosure is not limited in this regard. By adjusting X to be an appropriate value, the areas of the first dense area D1 and the second dense area D2 can have appropriate sizes, which is convenient for the subsequent process of rotating the pattern. In fact, according to FIGS. 4 and 5, by superimposing reference circle centers (e.g., the first intersection point C1 and the second intersection point C2), the statistical orientation distributions of the first irregular mesh pattern 121 and the second irregular mesh pattern 131 can be obtained. Therefore, in the subsequent consideration of reducing parasitic capacitance, the first dense area D1 of the first irregular mesh pattern 121 is staggered from the second dense area D2 of the second irregular mesh pattern 131 as much as possible during rotating.

In some embodiments, in order to obtain statistical significance to reflect the orientation distribution of the line segments of the grids, a number of the line segments of the first radial pattern 122 and a number of the line segments of the second radial pattern 132 are equal to or greater than 300, but the disclosure is not limited in this regard. By limiting the numbers of the line segments, it is helpful for the first radial pattern 122 and the second radial pattern 132 to present the line segment distribution of the first irregular mesh pattern 121 and the second irregular mesh pattern 131 respectively more accurately.

In some embodiments, a number of the separate regions of the first irregular mesh pattern 121 and a number of the separate regions of the second irregular mesh pattern 131 are equal to or greater than 5, but the disclosure is not limited in this regard. For example, five regions are circled on each mesh pattern and each region requires at least ten hexagonal grids (a total of 60 line segments) to obtain more than 300 line segments. By limiting the numbers of the separate regions, it is also helpful for the first radial pattern 122 and the second radial pattern 132 to present the line segment distribution of the first irregular mesh pattern 121 and the second irregular mesh pattern 131 respectively more accurately.

Figure 8:
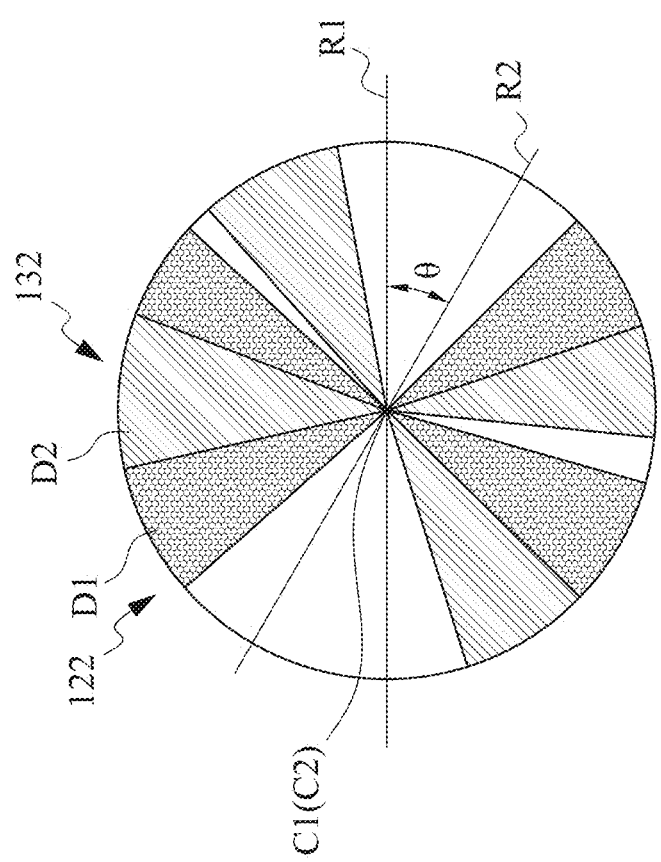
FIG. 8 is a schematic diagram showing the overlapping of the first radial pattern and the second radial pattern.

Reference is made to FIG. 8. FIG. 8 is a schematic diagram showing the overlapping of the first radial pattern 122 and the second radial pattern 132 after rotating by a specific angle so as to ensure one major fan-blade shape dense area is actually staggered from another major fan-blade shape dense area. FIG. 8 is generated by combining FIGS. 6 and 7, wherein FIG. 6 and FIG. 7 are rotated by certain angle. As shown in FIGS. 6 and 7, when the first radial pattern 122 and the second radial pattern 132 are directly translated so that the first intersection point C1 and the second intersection point C2 coincide, in such a condition, the first dense area D1 of the first radial pattern 122 and the second dense area D2 of the second radial pattern 132 will be positioned to overlap in random position and may at least partially overlap in the vertical projection direction without introducing the Moiré pattern effect issue. As shown in FIG. 8, by virtue of statistical software, after rotating the second radial pattern 132 by an angle θ around the second intersection point C2 along a rotation direction (e.g., the clockwise direction), the first dense area D1 of the first radial pattern 122 and the second dense area D2 of the second radial pattern 132 do not overlap in the vertical projection direction. Therefore, after adjusting the dense areas of the two mesh patterns, one of the mesh patterns can be rotated so that the dense areas thereof are actually staggered from the dense areas of the other mesh pattern, so as to effectively reduce the parasitic capacitance.

It should be noted that the first irregular mesh pattern 121 of the first mesh electrode layer 120 corresponds to the first radial pattern 122 in FIGS. 6 and 8, and the second irregular mesh pattern 131 of the second mesh electrode layer 130 corresponds to the second radial pattern 132 rotated by the angle θ in FIG. 8.

Figure 9:
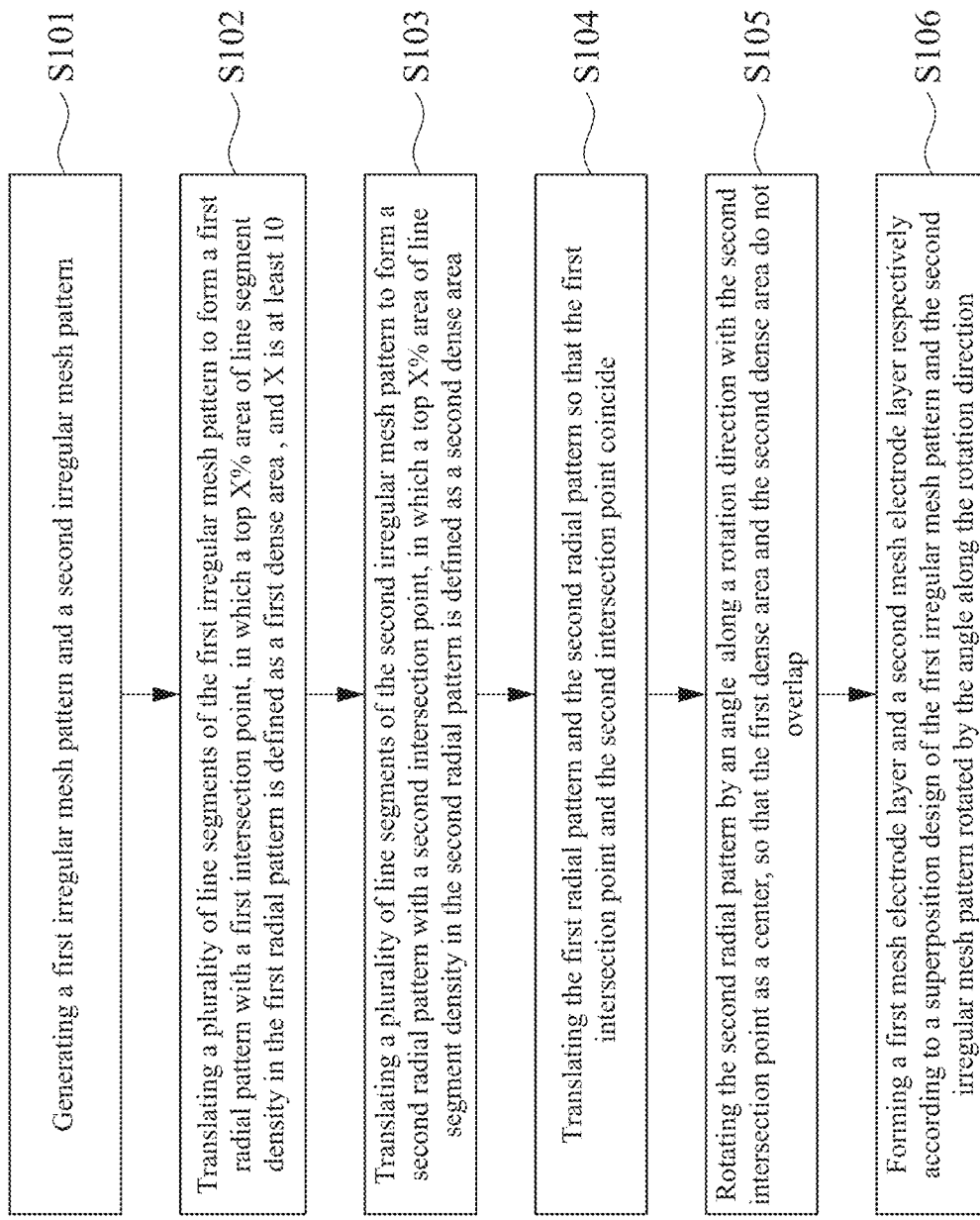
FIG. 9 is a flowchart of a method of manufacturing a touch module according to an embodiment of the present disclosure.

Reference is made to FIG. 9. FIG. 9 is a flowchart of a method of manufacturing a touch module according to an embodiment of the present disclosure. As shown in FIG. 9, the method of manufacturing the touch module includes steps S101 to S106, and reference may be made to FIG. 1 to FIG. 8. Step S101 to step S106 are described in detail as follows.

Step S101: generating a first irregular mesh pattern 121 and a second irregular mesh pattern 131.

Step S102: translating a plurality of line segments of the first irregular mesh pattern 121 to form a first radial pattern 122 with a first intersection point C1, in which a top X % fan-blade shape area of line segment density in the first radial pattern 122 is defined as a first dense area D1, and X is at least 10.

In some embodiments, step S102 makes the starting points of the line segments of the first irregular mesh pattern 121 coincide with the first intersection point C1.

Step S103: translating a plurality of line segments of the second irregular mesh pattern 131 to form a second radial pattern 132 with a second intersection point C2, in which a top X % fan-blade shape area of line segment density in the second radial pattern 132 is defined as a second dense area D2.

In some embodiments, step S103 makes the starting points of the line segments of the second irregular mesh pattern 131 coincide with the second intersection point C2.

Step S104: translating the first radial pattern 122 and the second radial pattern 132 so that the first intersection point C1 and the second intersection point C2 coincide.

Step S105: rotating the second radial pattern 132 by an angle θ along a rotation direction (e.g., the clockwise direction) with the second intersection point C2 as a center, so that the first dense area D1 and the second dense area D2 do not overlap.

Step S106: forming a first mesh electrode layer 120 and a second mesh electrode layer 130 respectively according to a superposition design of the first irregular mesh pattern 121 and the second irregular mesh pattern 131 rotated by the angle θ along the rotation direction.

In some embodiments, step S102 makes the line segments of the first radial pattern 122 be 360-degree radiating relative to the first intersection point C1, and step S103 makes the line segments of the second radial pattern 132 be 360-degree radiating relative to the second intersection point C2, as shown in FIGS. 6 and 7. However, the disclosure is not limited in this regard.

Figure 10:
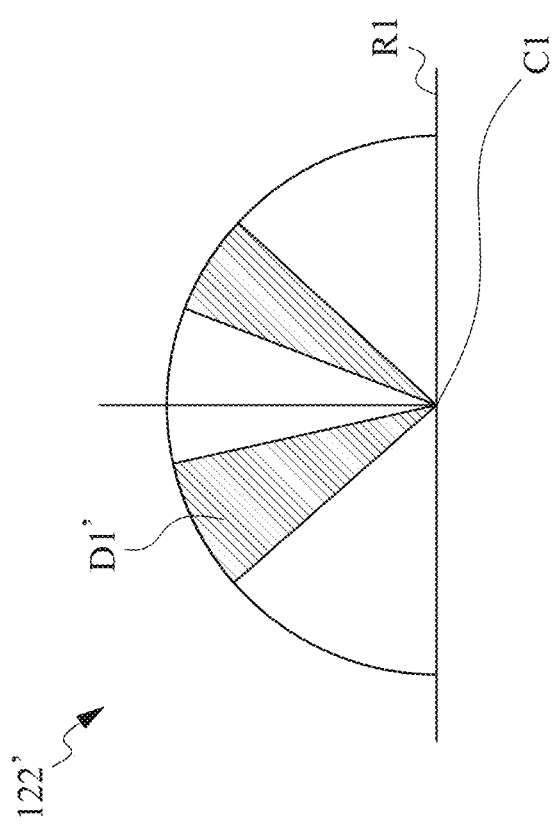
FIG. 10 is a schematic diagram of a first radial pattern according to another embodiment of the present disclosure.

Reference is made to FIGS. 10 and 11. FIG. 10 is a schematic diagram of a first radial pattern 122' according to another embodiment of the present disclosure. FIG. 11 is a schematic diagram of a second radial pattern 132' according to another embodiment of the present disclosure. As shown in FIGS. 10 and 11, the line segments of the first radial pattern 122' and the line segments of the second radial pattern 132' are 180-degree radiating relative to the first intersection point C1 and the second intersection point C2, respectively.

In order to obtain the first radial pattern 122' shown in FIG. 10, in some embodiments, step S102 may include step S102a to step S102c, and reference may be made to FIG. 6 and FIG. 10. Step S102a to step S102c are described in detail as follows.

Step S102a: making the starting points of the line segments of the first irregular mesh pattern 121 coincide with the first intersection point C1.

Step S102b: dividing the line segments of the first irregular mesh pattern 121 into a first group G11 and a second group G12 based on a first reference line R1 passing through the first intersection point C1.

Step S102c: rotating the second group G12 of the first irregular mesh pattern 121 by 180 degrees along the rotation direction (e.g., the clockwise direction) with the first intersection point C1 as a center, so that the first group G11 and the rotated second group G12 of the first irregular mesh pattern 121 form a first radial pattern 122' with a first dense area D1'.

Similarly, in order to obtain the second radial pattern 132' shown in FIG. 11, in some embodiments, step S103 may include step S103a to step S103c, and reference may be made to FIG. 6, FIG. 7, and FIG. 10. Step S103a to step S103c are described in detail as follows.

Step S103a: making the starting points of the line segments of the second irregular mesh pattern 131 coincide with the second intersection point C2.

Step S103b: dividing the line segments of the second irregular mesh pattern 131 into a first group G21 and a second group G22 based on a second reference line R2 passing through the second intersection point C2.

Step S103c: rotating the second group G22 of the second irregular mesh pattern 131 by 180 degrees along the rotation direction (e.g., the clockwise direction) with the second intersection point C2 as a center, so that the first group G21 and the rotated second group G22 of the second irregular mesh pattern 131 form a second radial pattern 132' with a second dense area D2'.

According to the foregoing recitations of the embodiments of the disclosure, it can be seen that in the touch module and the method of manufacturing the same of the present disclosure, when the first radial pattern obtained from the first mesh electrode layer and the second radial pattern obtained from the second mesh electrode layer are translated so that the first intersection point of the first radial pattern coincides with the second intersection point of the second radial pattern, the first dense area of the first radial pattern does not overlap with the second dense area of the second radial pattern in the projection direction. In this way, the Moiré effect of the touch module can be effectively solved and the parasitic capacitance can be reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch module, comprising:
   a first mesh electrode layer having a first irregular mesh pattern, the first irregular mesh pattern comprising a plurality of line segments configured to form a first radial pattern having a first intersection point by translation, a top X % fan-blade shape area of line segment density in the first radial pattern being defined as a first dense area, wherein X is at least 10, the line segments of the first radial pattern are obtained from a plurality of grids of the first irregular mesh pattern, and the grids of the first irregular mesh pattern are located in separate regions of the first irregular mesh pattern; and
   a second mesh electrode layer having a second irregular mesh pattern, the second irregular mesh pattern comprising a plurality of line segments configured to form a second radial pattern having a second intersection point by translation, a top X % fan-blade shape area of line segment density in the second radial pattern being defined as a second dense area, wherein the line segments of the second radial pattern are obtained from a plurality of grids of the second irregular mesh pattern, and grids of the second irregular mesh pattern are located in separate regions of the second irregular mesh pattern, wherein when the first radial pattern and the second radial pattern are translated so that the first intersection point and the second intersection point coincide, the first dense area and the second dense area do not overlap in a projection direction, and wherein a number of the separate regions of the first irregular mesh pattern and a number of the separate regions of the second irregular mesh pattern are equal to or greater than 5.

2. The touch module of claim 1, wherein X is 15, 20, or 30.

3. The touch module of claim 1, wherein the line segments of the first radial pattern and the line segments of the second radial pattern are 360-degree radiating relative to the first intersection point and the second intersection point, respectively.

4. The touch module of claim 1, wherein the line segments of the first radial pattern and the line segments of the second radial pattern are 180-degree radiating relative to the first intersection point and the second intersection point, respectively.

5. The touch module of claim 1, wherein a number of the line segments of the first radial pattern and a number of the line segments of the second radial pattern are equal to or greater than 300.

6. A method of manufacturing a touch module, comprising:
generating a first irregular mesh pattern and a second irregular mesh pattern;
translating a plurality of line segments of the first irregular mesh pattern to form a first radial pattern with a first intersection point, wherein a top X % fan-blade shape area of line segment density in the first radial pattern is defined as a first dense area, X is at least 10, the line segments of the first radial pattern are obtained from a plurality of grids of the first irregular mesh pattern, and the grids of the first irregular mesh pattern are located in separate regions of the first irregular mesh pattern;
translating a plurality of line segments of the second irregular mesh pattern to form a second radial pattern with a second intersection point, wherein a top X % fan-blade shape area of line segment density in the second radial pattern is defined as a second dense area, the line segments of the second radial pattern are obtained from a plurality of grids of the second irregular mesh pattern, the grids of the second irregular mesh pattern are located in separate regions of the second irregular mesh pattern, and a number of the separate regions of the first irregular mesh pattern and a number of the separate regions of the second irregular mesh pattern are equal to or greater than 5;
translating the first radial pattern and the second radial pattern so that the first intersection point and the second intersection point coincide;
rotating the second radial pattern by an angle along a rotation direction with the second intersection point as a center, so that the first dense area and the second dense area do not overlap; and
forming a first mesh electrode layer and a second mesh electrode layer respectively according to a superposition design of the first irregular mesh pattern and the second irregular mesh pattern rotated by the angle along the rotation direction.

7. The method of claim 6, wherein X is 15, 20, or 30.

8. The method of claim 6, wherein each of the line segments of each of the grids has a starting point and an end point along an arrangement direction, the translating the line segments of the first irregular mesh pattern makes the starting points of the line segments of the first irregular mesh pattern coincide with the first intersection point, and the translating the line segments of the second irregular mesh pattern makes the starting points of the line segments of the second irregular mesh pattern coincide with the second intersection point.

9. The method of claim 8, wherein the translating the line segments of the first irregular mesh pattern makes the line segments of the first radial pattern be 360-degree radiating relative to the first intersection point, and the translating the line segments of the second irregular mesh pattern makes the line segments of the second radial pattern be 360-degree radiating relative to the second intersection point.

10. The method of claim 6, wherein each of the line segments of each of the grids has a starting point and an end point along an arrangement direction, and the translating the line segments of the first irregular mesh pattern comprises:
making the starting points of the line segments of the first irregular mesh pattern coincide with the first intersection point;
dividing the line segments of the first irregular mesh pattern into a first group and a second group based on a first reference line passing through the first intersection point; and
rotating the second group of the first irregular mesh pattern by 180 degrees along the rotation direction with the first intersection point as a center, so that the first group and the rotated second group of the first irregular mesh pattern form the first radial pattern,
wherein the translating the line segments of the second irregular mesh pattern comprises:
making the starting points of the line segments of the second irregular mesh pattern coincide with the second intersection point;
dividing the line segments of the second irregular mesh pattern into a first group and a second group based on a second reference line passing through the second intersection point; and
rotating the second group of the second irregular mesh pattern by 180 degrees along the rotation direction with the second intersection point as a center, so that the first group and the rotated second group of the second irregular mesh pattern form the second radial pattern.

11. The method of claim 10, wherein the translating the line segments of the first irregular mesh pattern makes the line segments of the first radial pattern be 180-degree radiating relative to the first intersection point, and the translating the line segments of the second irregular mesh pattern makes the line segments of the second radial pattern be 180-degree radiating relative to the second intersection point.

12. The method of claim 6, wherein a number of the line segments of the first radial pattern and a number of the line segments of the second radial pattern are equal to or greater than 300.

* * * * *